(12) United States Patent
Watanabe et al.

(10) Patent No.: US 9,981,579 B2
(45) Date of Patent: May 29, 2018

(54) VEHICLE SEAT

(71) Applicant: TOYOTA BOSHOKU KABUSHIKI KAISHA, Aichi-ken (JP)

(72) Inventors: Toyotaka Watanabe, Gifu-ken (JP); Ayumi Hirata, Aichi-ken (JP); Shuhei Kaseda, Aichi-ken (JP); Tomoyuki Takase, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days. days.

(21) Appl. No.: 15/277,432

(22) Filed: Sep. 27, 2016

(65) Prior Publication Data
US 2017/0088027 A1 Mar. 30, 2017

(30) Foreign Application Priority Data

Sep. 30, 2015 (JP) .................................. 2015-193582

(51) Int. Cl.
*B60N 2/58* (2006.01)
*B60N 2/22* (2006.01)

(52) U.S. Cl.
CPC ................ *B60N 2/58* (2013.01); *B60N 2/22* (2013.01)

(58) Field of Classification Search
CPC ........... B60N 2/58; B60N 2/22; B60N 2/5816
USPC .............................. 297/378.1, 15; 296/65.09
See application file for complete search history.

(56) References Cited

U.S. PATENT DOCUMENTS

| 4,848,826 A | 7/1989 | Kuwabara et al. |
| 2014/0103692 A1* | 4/2014 | Toyama ................... B60N 2/36 297/354.1 |

FOREIGN PATENT DOCUMENTS

| DE | 20009327 U1 | 9/2001 |
| EP | 1854657 B1 | 11/2007 |
| JP | 11-278157 | 10/1999 |
| JP | 4567566 | 10/2010 |
| JP | 4677605 | 4/2011 |
| JP | 2013-209002 | 10/2013 |

OTHER PUBLICATIONS

German Official Action in counterpart application No. DE 10 2016 218 728.7, dated Dec. 8, 2017 (with English translation).

* cited by examiner

*Primary Examiner* — Milton Nelson, Jr.
(74) *Attorney, Agent, or Firm* — Greenblum & Bernstein, P.L.C.

(57) ABSTRACT

A vehicle seat includes a seatback configured to be tiltable in a front-rear direction; and a flexible covering configured to extend from the seatback to a deck board positioned behind the seatback. The covering includes a shaped portion that is provided in an intermediate location in a length direction of the extending covering, and is shaped so as to facilitate bending of the covering toward a region below the deck board, and a reinforcing portion that increases rigidity of a region away from the shaped portion so as to facilitate transmission of elastic force to the shaped portion, the elastic force being generated at a time when the covering bends due to a change in a separation distance between both end portions of the extending covering in the length direction in response to tilting of the seatback.

7 Claims, 5 Drawing Sheets

VEHICLE SEAT

INCORPORATION BY REFERENCE

The disclosure of Japanese Patent Application No. 2015-193582 filed on Sep. 30, 2015 including the specification, drawings and abstract is incorporated herein by reference in its entirety.

BACKGROUND OF THE INVENTION

1. Field of the Invention

The invention relates to a vehicle seat. More particularly, the invention relates to a vehicle seat in which a flexible covering extends from a seatback to a deck board positioned behind the seatback.

2. Description of Related Art

Japanese Patent Application Publication No. 2013-209002 (JP 2013-209002 A) describes a structure in which a carpet extends from a back portion of a seatback to a deck board of a luggage compartment behind the seatback so as to cover and thus hide a gap therebetween. When the seatback is in a standing state in which the seatback is used as a backrest, the carpet relaxes and hangs down in the gap between the seatback and the deck board. Also, when the seatback is tilted forward, the carpet is pulled forward following the seatback so as to be stretched between the seatback and the deck board.

SUMMARY OF THE INVENTION

In the related art described above, the carpet is sewn in a valley fold shape in advance so that the carpet tends to hang down when the seatback is in the standing state. However, although the carpet is sewn in a valley fold shape as described above, the carpet may be pushed into a bulging mountain fold shape due to some momentum when the seatback is raised because no force that pulls the carpet downward is applied.

The invention provides a vehicle seat that is configured to facilitate deformation of a covering toward a region below a deck board without pulling the covering downward, the covering extending from a seatback to the deck board.

An aspect of the invention relates to a vehicle seat including a seatback configured to be tillable in a front-rear direction; and a flexible covering configured to extend from the seatback to a deck board positioned behind the seatback. The covering includes a shaped portion that is provided in an intermediate location in a length direction of the extending covering, and is shaped so as to facilitate bending of the covering toward a region below the deck board, and a reinforcing portion that increases rigidity of a region away from the shaped portion so as to facilitate transmission of elastic force to the shaped portion, the elastic force being generated at a time when the covering bends due to a change in a separation distance between both end portions of the extending covering in the length direction in response to tilting of the seatback.

According to this structure, when the separation distance between both end portions of the extending covering in the length direction changes due to tilting of the seatback, the elastic force, which is generated at the time when the covering bends due to that change in the separation distance, is appropriately transmitted to the shaped portion due to the rigidity of the reinforcing portion, and thus the shaped portion promotes deformation of the covering toward the region below the deck board. Thus, the covering can be configured to more easily deform toward the region below the deck board, without pulling the covering downward.

In the above-described aspect, the reinforcing portion may be constituted by a folded portion that is provided to extend along an end portion of the covering in a width direction.

This structure makes it possible to obtain the reinforcing portion simply by folding the end portion of the covering in the width direction.

In the above-described aspect, the covering may further include a shape retaining portion that keeps the shaped portion in a shape that facilitates bending of the covering.

This structure enables the shaped portion to function more effectively and stably.

In the above-described aspect, the shaped portion may be constituted by a V-shaped bent portion provided in the covering, and the shape retaining portion may be constituted by a joined portion in which intermediate portions of the V-shaped bent portion are joined together.

This structure enables the shaped portion to function more effectively.

In the above-described aspect, the reinforcing portion may be provided to extend up to a region where the shape retaining portion of the shaped portion is provided.

This structure makes it possible to more appropriately transmit the elastic force generated at the time when the covering bends due to the tilting of the seatback, to the shaped portion via the reinforcing portion.

In the above-described aspect, the reinforcing portion may be provided in both a region that extends toward the seatback from the shaped portion and a region that extends toward the deck board from the shaped portion.

According to this structure, the elastic force, which is generated at the time when the covering bends due to the tilting of the seatback, can be transmitted to the shaped portion from both the seatback-side and the deck board-side, and thus, the shaped portion can more effectively function to bend and deform the covering.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings.

Figure 1:
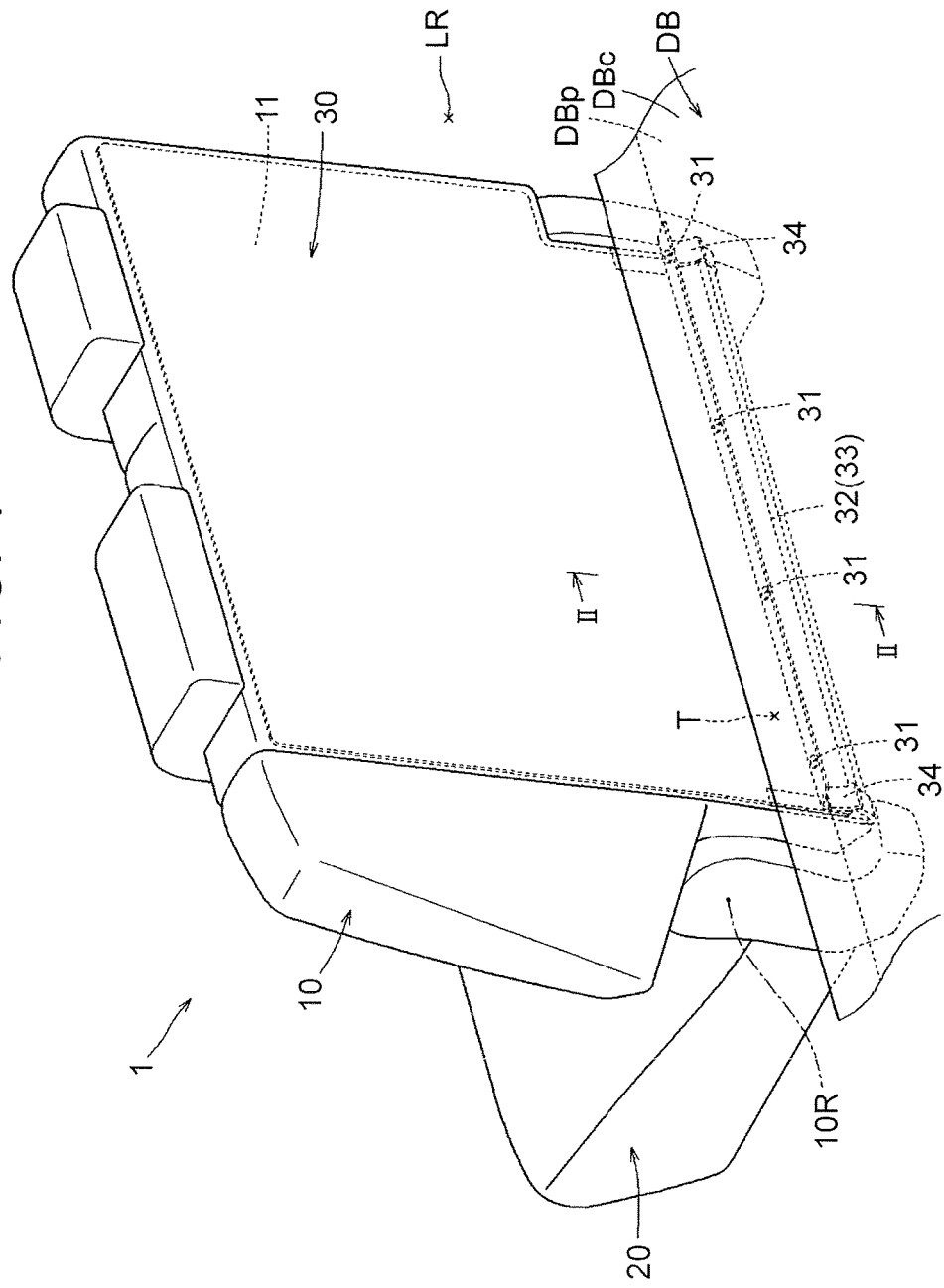
FIG. 1 is a perspective view schematically showing the structure of a vehicle seat according to one example embodiment of the invention.
Figure 2:
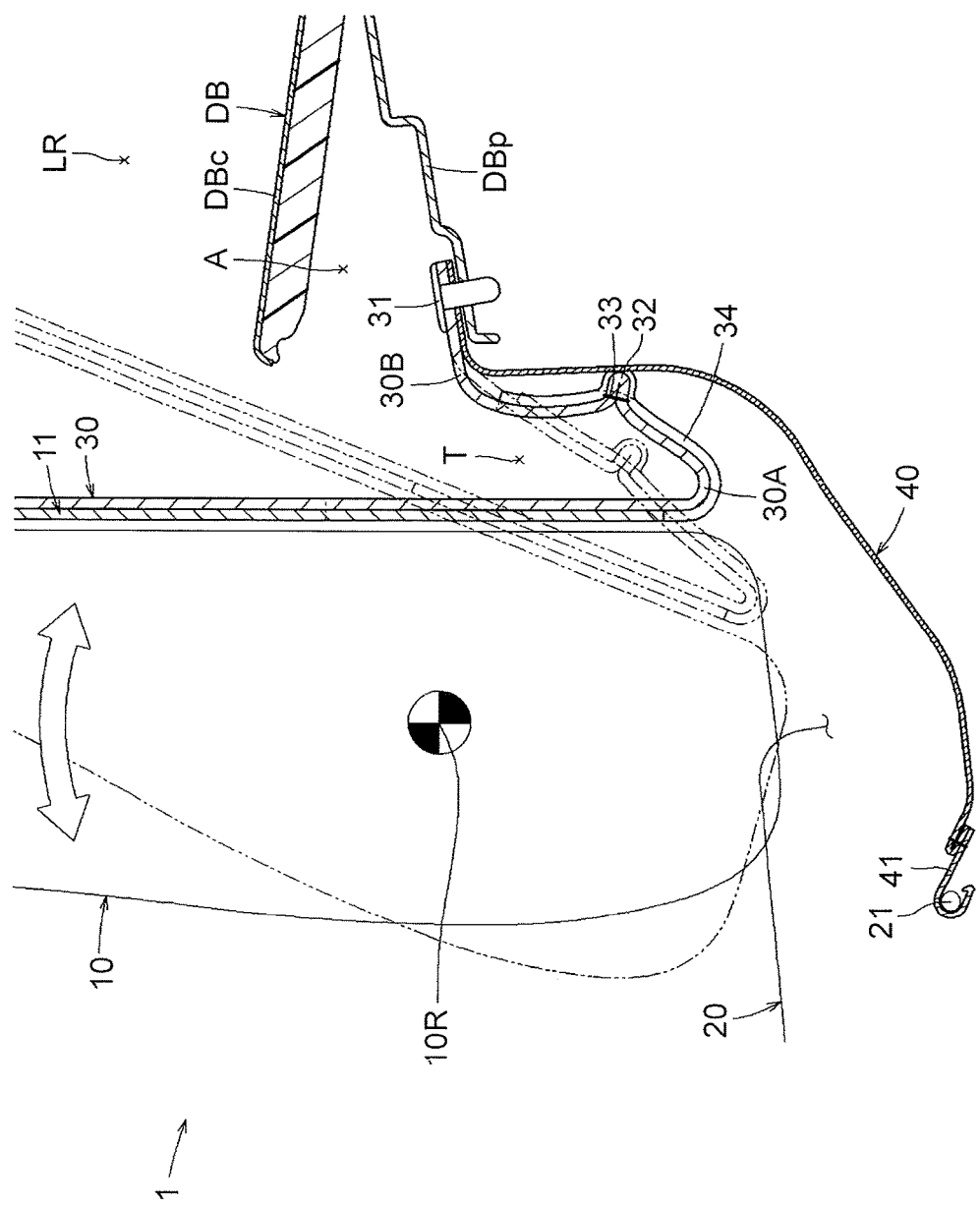
FIG. 2 is a sectional view taken along line II-II in FIG. 1.

First, the structure of a vehicle seat according to one example embodiment of the invention will be described with reference to FIGS. 1 to 5. The vehicle seat in this example embodiment is configured as a rear seat 1 in the rearmost row of an automobile (a vehicle), as shown in FIGS. 1 and 2. A luggage compartment LR at a back portion of the vehicle is formed behind the rear seat 1. The rear seat 1 includes a seatback 10 that serves as a backrest for a seated occupant, and a seat cushion 20 that serves as a seating portion for the seated occupant. The seatback 10 is connected to a rear end portion of the seat cushion 20 via a recliner, not shown. As shown in FIG. 2, the backrest angle of the seatback 10 can be adjusted (i.e., the seatback 10 is tiltable) in a front-rear direction around a rotational center 10R set in the recliner (not shown), and the seatback 10 can be fixed at each adjusted position.

Figure 3:
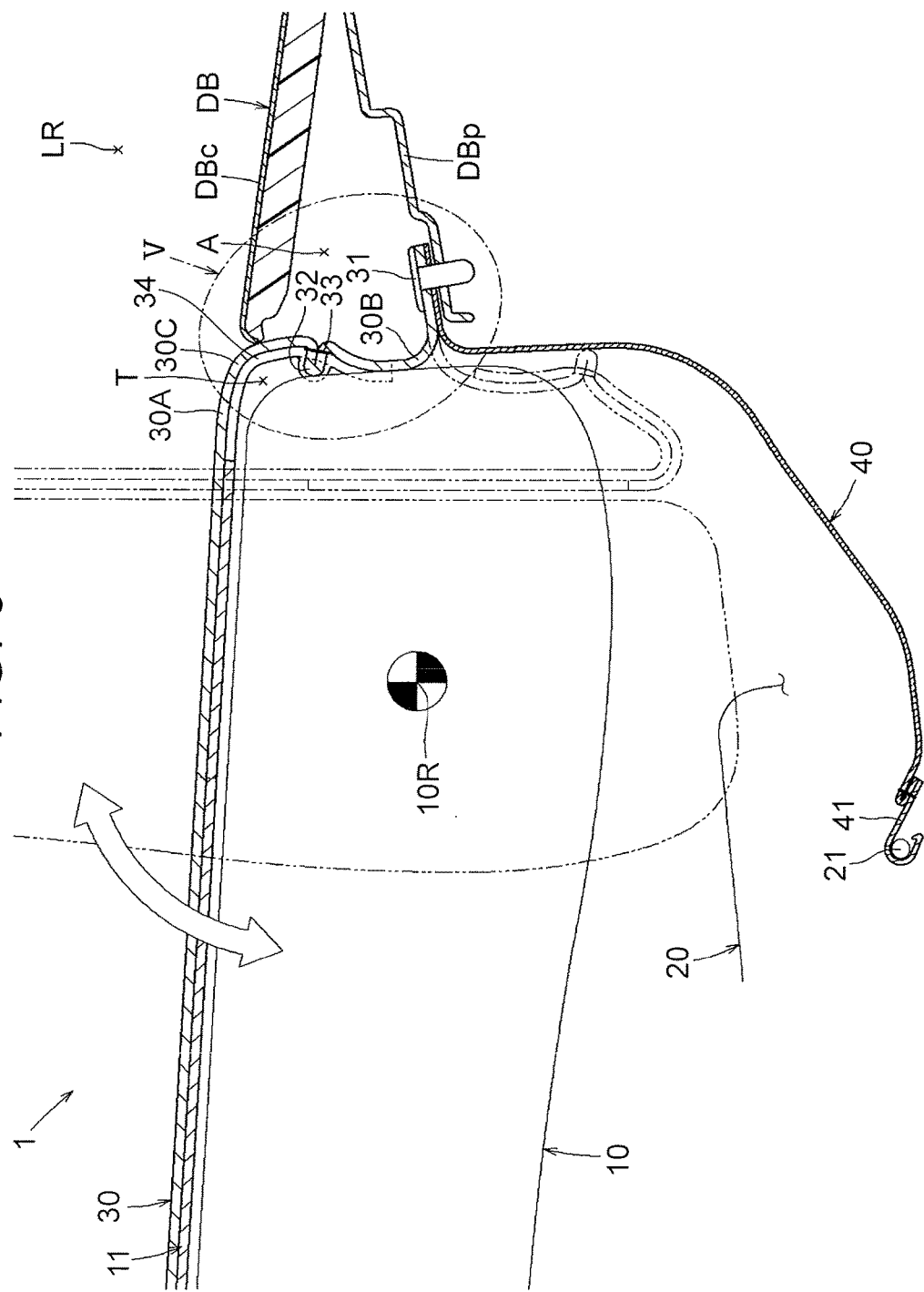
FIG. 3 is a sectional view illustrating a state in which a seatback has been laid forward from the state shown in FIG. 2.

Also, the structure in which the backrest angle of the seatback 10 is able to be changed enables the seatback 10 to tilt forward to a position at which the seatback 10 is folded down (i.e., laid) above an upper surface portion of the seat cushion 20 as shown in FIG. 3, from the standing state in which the seatback 10 is used as a backrest as shown in FIG. 2. Interference between the cushion structure of an inner portion of the seatback 10 that protrudes toward the backrest surface side thereof and the cushion structure of an inner portion of the seat cushion 20 that protrudes toward the seating surface side thereof prevents the seatback 10 from tilting forward beyond the position at which the seatback 10 is laid above the seat cushion 20 so as to be slightly inclined upward in a direction toward the front side.

In addition, a deck board DB that is made substantially of resin and forms a floor surface of the luggage compartment LR described above is also formed to be slightly inclined upward in the direction toward the front side, such that the deck board DB forms a floor surface that is flush with the back surface of the seatback 10 when the seatback 10 is laid above the seat cushion 20 so as to be slightly inclined upward in the direction toward the front side. As a result, when the seatback 10 is tilted forward and laid, the back surface of the seatback 10 and the upper surface of the deck board DB form a substantially flush floor surface with no step therebetween, such that the space that can be used as the floor surface of the luggage compartment LR is conveniently expanded.

As shown in FIGS. 2 and 3, a gap T is formed between the seatback 10 and the deck board DB. This gap T is provided to avoid interference between the seatback 10 and the deck board DB when the backrest angle of the seatback 10 is adjusted and when the seatback 10 is tilted forward. This gap T is formed as a stepwise space that extends downward between the seatback 10 and the deck board DB. As a result, this gap T ends up creating a break in the floor surface formed between the seatback 10 and the deck board DB when the seatback 10 is laid forward. Therefore, a carpet 30 is provided between the seatback 10 and the deck board DB. The carpet 30 is disposed to extend from the seatback 10 to the deck board DB, and thus, the carpet 30 functions to eliminate the break in the floor surface. Here, the carpet 30 may be regarded as the "covering" of the invention.

This carpet 30 is formed by a single sheet of planar material that has been cut in a generally rectangular shape, the planar material being the same material as carpeting DBc that covers the top of the deck board DB. A front-side region of the carpet 30 that is attached to the seatback 10 overlaps with the back surface of a resin backboard 11 that is attached to a back portion of the seatback 10, and the surface of the front-side region of the carpet 30 adheres to the back surface of the resin backboard 11. Since the surface of the carpet 30 adheres to the back surface of the resin backboard 11, the back surface of the seatback 10 can form a design surface in which there is continuity with the carpeting DBc that covers the upper surface of the deck board DB, when the seatback 10 is laid forward and the back surface of the seatback 10 forms the floor surface that is flush with the upper surface of the deck board DB. Also, since the hard backboard 11 is hidden underneath the carpet 30, the back surface of the seatback 10 exhibits strong support stiffness as well as the deck board DB, when the seatback 10 is laid forward and the back surface thereof is used as the floor surface of the luggage compartment LR.

Also, the rear-end side region of the carpet 30 that is attached to the deck board DB overlaps with the top of a deck panel DBp that is positioned underneath the front-end side of the deck board DB, and the rear-end side region of the carpet 30 is fixed (i.e., fastened) by fixing pins 31 at four portions in the vehicle width direction (the width direction). More specifically, the rear-end side region of the carpet 30 is set so as to overlap with a rear-end side region of a separate non-woven fabric 40 that is underneath the rear-end side region of the carpet 30, and the four portions of the carpet 30 in the vehicle width direction are fastened, together with the non-woven fabric 40, to the top of the deck panel DBp by the fixing pins 31.

The non-woven fabric 40 extends along the rear lower side of the seatback 10 from the rear-end side locations where the non-woven fabric 40 is fixed by the fixing pins 31, and extends below the seat cushion 20. A hook 41 that is attached to the distal edge portion of the non-woven fabric 40 is hooked on a wire 21 provided on a rear lower portion of the seat cushion 20, and thus, the non-woven fabric 40 extends from the seat cushion 20 to the deck panel DBp. Since the non-woven fabric 40 extends from the seat cushion 20 to the deck panel DBp, it is possible to stop small objects (not shown) from falling down through the gap T between the seatback 10 and the deck board DB when the carpet 30 is detached.

The deck panel DBp is positioned with a space A in the height direction between the deck panel DBp and the deck board DB. Thus, it is possible to easily perform, for example, the work of setting the carpet 30 and the non-woven fabric 40 on the deck panel DBp and the work of fastening the carpet 30 and the non-woven fabric 40 to the deck panel DBp with the four fixing pins 31, through the space A. The deck panel DBp is located at a position lower than the position of the deck board DB, and a front-end side panel surface of the deck panel DBp to which the carpet 30 and the non-woven fabric 40 are attached is formed to protrude forward to substantially the same position as the position of a front-end side edge portion of the deck board DB, with the front-end side panel surface of the deck panel DBp facing substantially directly in the height direction, as shown in FIGS. 2.

The surface of the front-side region of the carpet 30 integrally adheres to the back surface of the backboard 11 of the seatback 10, as shown in FIG. 2, and thus, a portion 30A of the carpet 30 that extends downward from the backboard 11 exerts elastic restoring force in a direction such that the portion 30A is made flush with the backboard 11, due to the support stiffness of the portion whose surface adheres to the backboard 11. Also, in the same way, the rear-end side region of the carpet 30 is fastened in an overlapping manner to the top of the deck panel DBp, and thus, a portion 30B of the carpet 30 that extends toward the front side from the deck panel DBp tends to exert elastic restoring force in a direction such that this portion 30B is made flush with the deck panel DBp, due to the support stiffness of the portion that is fastened to the top of the deck panel DBp.

When the seatback 10 is in the standing state in which the seatback 10 is used as a backrest as shown in FIG. 2, a lower end of the backboard 11 is located at a position lower than the position of a front end of the deck panel DBp, so the carpet 30 forms a V-shape (a valley fold shape) between the backboard 11 and the deck panel DBp. In contrast, when the seatback 10 is folded down (i.e., laid) forward above the upper-surface portion of the seat cushion 20 as shown in FIG. 3, a lower end (the rear end when the seatback 10 is laid forward) of the backboard 11 is located at a position higher than the position of the front end of the deck panel DBp, such that the carpet 30 forms a reverse S-shape as described below. That is, the carpet 30 takes on a shape in which it is bent in a reverse S-shape (crank shape) between the backboard 11 and the deck panel DBp, by the action of the elastic force of the portion 30A that extends downward (toward the rear side when the seatback 10 is laid forward) from the back surface of the backboard 11, and the elastic force of the portion 30B that extends toward the front side from the upper surface of the deck panel DBp.

As a result of the carpet 30 bending in this reverse S-shape (crank shape) in this way, the portion 30A that extends toward the rear side from the backboard 11 when the seatback 10 is laid forward is stretched so as to be flush with the backboard 11, and is substantially flush with the carpeting DBc that covers the top of the deck board DB. Also, the portion 30A of the carpet 30 that extends toward the rear side from the backboard 11 is pulled into a shape that curves downward (a curved portion 30C) at a position just forward of a position where the portion 30A would interfere with the deck board DB, by the action of the elastic force of the portion 30B that extends toward the front side from the top of the deck panel DBp, such that the portion 30A is maintained in a shape in which the portion 30A avoids interfering with the deck board DB, while the portion 30A closes the gap T between the seatback 10 and the deck board DB.

However, if there is a crease near the location where the carpet 30 is fastened to the deck panel DBp or if the carpet 30 is caught by something, for example, if the carpet 30 interferes with a pad (not shown) in the seatback 10 when the seatback 10 is laid forward, the portion 30A that extends toward the rear side from the backboard 11 of the seatback 10 may end up not being appropriately pulled downward, and instead end up bending in a shape that protrudes upward between the backboard 11 and the deck board DB. If the carpet 30 ends up bending in this way, the appearance and the usability as a floor surface may be adversely affected.

Therefore, the carpet 30 is provided with a bent portion 32 that acts to constantly facilitate deformation of the carpet 30 toward a region below the deck board DB such that the portion 30A that extends toward the rear side from the backboard 11 does not bend to protrude upward from the deck board DB when the seatback 10 is laid forward or raised from the forward laying position. Here, the bent portion 32 may be regarded as the "shaped portion" of the invention.

The bent portion 32 is formed by folding a portion of the carpet 30 into a shape with a V-shaped (valley fold shaped) cross-section that is uniform along the entire region in the vehicle width direction. The bent portion 32 is provided at an intermediate portion in the length direction of the carpet 30, that is, a portion between the portion 30A that extends downward (toward the rear side when the seatback 10 is laid forward) from the back surface of the backboard 11, and the portion 30B that extends toward the front side from the top of the deck panel DBp (see FIGS. 2 and 4). While the carpet 30 is folded in a valley fold shape when the seatback 10 is in the standing state in which the seatback 10 is used as a backrest, the bent portion 32 is disposed at a surface portion that extends toward the rear upper side from a valley bottom portion such that the bent shape of the bent portion 32 faces toward the rear side, as shown in FIG. 2. As a result, the bent portion 32 is in a position that is difficult to see when the gap T between the seatback 10 and the deck board DB is seen from the outside, and thus the bent portion 32 does not adversely affect the appearance of the inside of the gap T.

Also, the bent portion 32 is formed in a position in a region closer to the location where the carpet 30 is fastened to the deck panel DBp than the location where the curved portion 30C is formed, when the seatback 10 is laid forward and the carpet 30 is bent in the reverse S-shape, as shown in FIG. 3. This bent portion 32 serves to promote deformation of the carpet 30 such that when the weight of the carpet 30 itself acts on the carpet 30 or force that compresses the carpet 30 in the in-plane direction from both end sides in the length direction is applied to the carpet 30, the carpet 30 easily folds (i.e., bends) in the out-of-plane direction in which the bent portion 32 is bent, due to the bent shape of the bent portion 32 that is valley-folded in a V-shape (see FIG. 5).

The bent portion 32 intensively receives the action of bending stress as the carpet 30 bends in the reverse S-shape, and consequently bends and deforms, due to the pre-folded structure that tends to induce bending deformation when the seatback 10 is laid forward, as shown in FIG. 3. As a result of this bending deformation, the bent portion 32 is positioned in an intermediate location in the length direction when the carpet 30 is bent in the reverse S-shape, and the bent portion 32 promotes deformation of a connecting portion between the portion 30A of the carpet 30 that extends toward the rear side from the backboard 11 and the portion 30B of the carpet 30 that extends toward the front side from the top of the deck panel DBp such that a region that is lower than the portion 30A of the carpet 30 bends toward the front side.

In this way, the bent portion 32 is formed by shaping the carpet 30 such that bending deformation of the carpet 30 is promoted toward the region below the portion 30A extending toward the rear side from the backboard 11. With this structure, bending stress is constantly applied in a concentrated manner to the bent portion 32 that tends to induce the bending deformation described above, and thus, a crease is not readily formed at another location on the carpet 30. Also, even if the carpet 30 interferes with a pad (not shown) in the seatback 10 when the seatback 10 is laid forward, acting force that lifts the carpet 30 up is prevented from being exerted, because deformation is promoted by the bent portion 32 as described above. Therefore, the portion 30A of the carpet 30 that extends toward the rear side from the backboard 11 is not bent in a shape that protrudes upward between the backboard 11 and the deck board DB.

Figure 4:
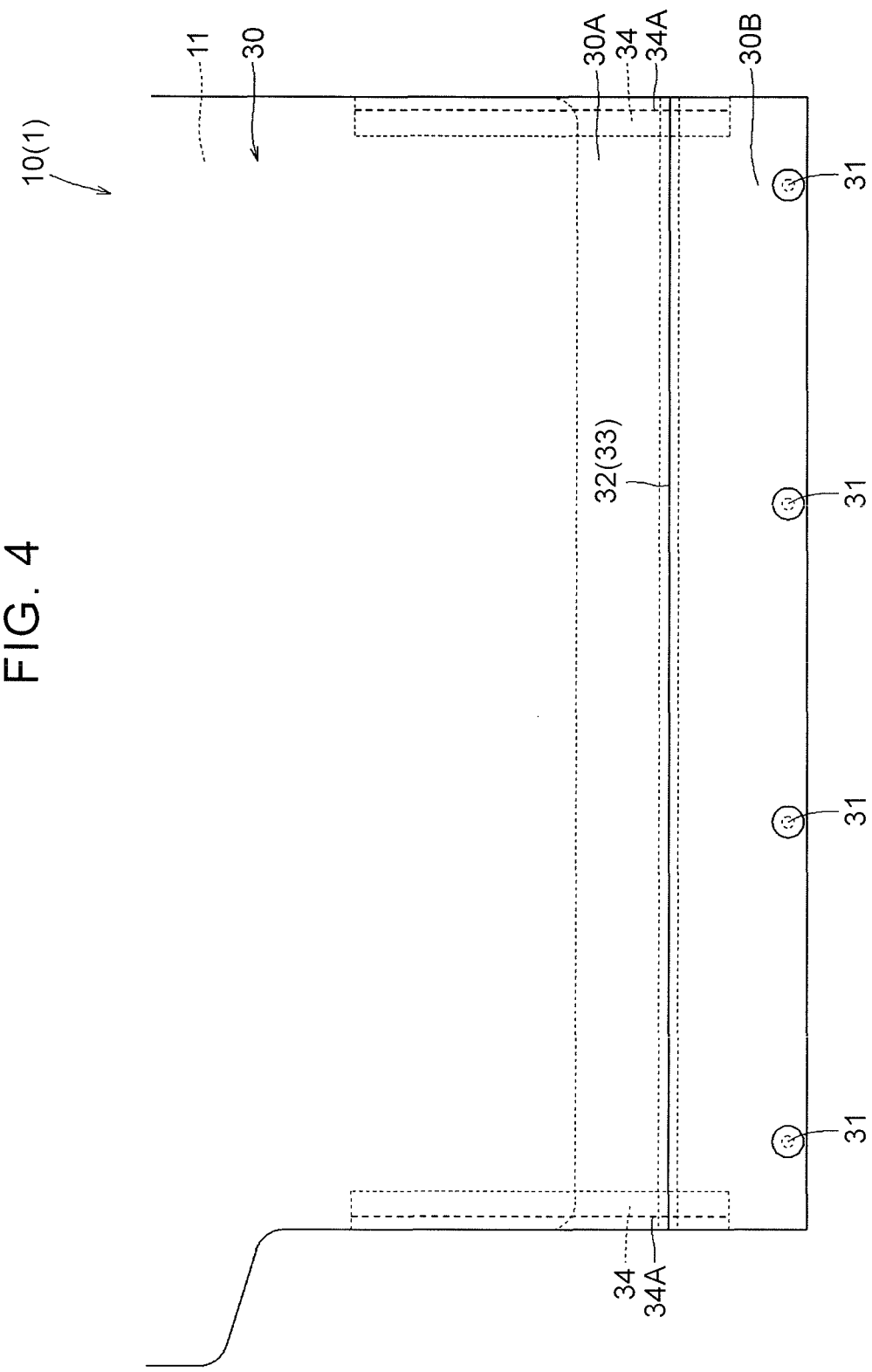
FIG. 4 is a rear view of a carpet.
Figure 5:
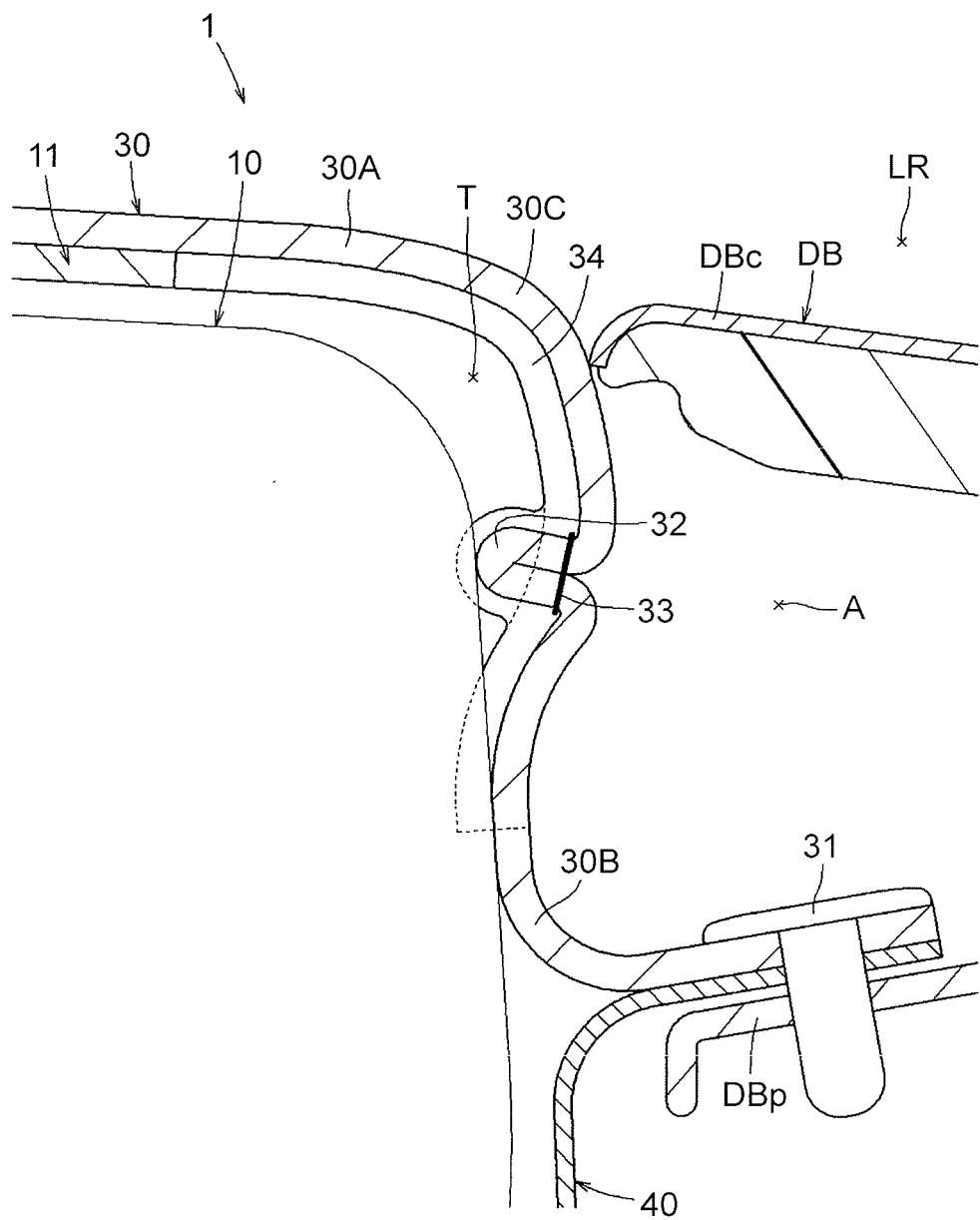
FIG. 5 is an expanded view of a portion V in FIG. 3.

More specifically, the bent portion 32 is in a state where base side portions of the fold that are positioned on both end sides of the V-shape are joined with their surfaces attached together, by a sewn portion 33 that sews these base end portions together, as shown in FIG. 5. This sewn portion 33 strongly keeps the bent portion 32 folded in the V-shape, and thus enables the bent portion 32 to more effectively and stably induce bending deformation of the carpet 30. The sewn portion 33 is also formed uniformly along the entire region of the carpet 30 in the vehicle width direction, as shown in FIG. 4. Here, the sewn portion 33 may be regarded as the "shape retaining portion" and the "joined portion" of the invention.

Also, in the carpet 30, edge portions in both end sides, in the vehicle width direction, of the region where the bent portion 32 is provided are formed as folded portions 34.

Each of the folded portions 34 is formed by folding back a portion of the carpet 30 downward along the edge portion and overlapping two layers formed by folding back the portion of the carpet 30. The two layers of each folded portion 34 are integrally joined together in a continuous manner along the edge portion of the fold by a sewn portion 34A that sews them together, so the folded portion 34 has a bending stiffness that is higher than that of the center area of the carpet 30 in the vehicle width direction where there is no fold. Specifically, the folded portions 34 are formed in the edge portions in the vehicle width direction, in both a region where the surface of the carpet 30 adheres to the backboard 11, and a region that extends downward (i.e., toward the rear side when the seatback 10 is laid forward) from the region where the surface of the carpet 30 adheres to the backboard 11. More specifically, the folded portions 34 are formed in the edge portions in the vehicle width direction in the regions of the carpet 30 excluding a region on the distal end side that is on the top of the deck panel DBp, as shown in FIG. 2. Here, each of the folded portions 34 may be regarded as the "reinforcing portion" of the invention.

The folded portions 34 on the edge portions of the carpet 30 in the vehicle width direction are formed by folding portions of the carpet 30 at a stage before the bent portion 32 is formed by folding a portion of the carpet 30. Then, after each of the folded portions 34 is formed, the folded portion 34 is sewn (by the sewn portion 34A) such that the two layers of the folded portion 34 are joined together to overlap with each other. Then after the two layers of the folded portion 34 are joined together, the bent portion 32 is formed to extend between the right folded portion 34 and the left folded portion 34, by folding the portion of the carpet 30 into a shape having a V-shaped cross-section. Then after this, the bent portion 32 formed by folding the portion of the carpet 30 is sewn by the sewn portion 33. As a result, the folded portions 34 extend beyond the sewn portion 33 and enter the region where the bent portion 32 is formed.

Each of the folded portions 34 is formed by folding back the portion of the carpet 30 downward. Therefore, although the folded portions 34 enter the region where the bent portion 32 is formed as described above, the bent portion 32 can be formed in an appropriate V-shape by folding the portion of the carpet 30 and sewn by the sewn portion 33 such that the surfaces of the base side portions of the fold are attached together and are prevented from separating from each other, because the layer on the folded-back side (i.e., the folded-back portion) in each folded portion 34 is positioned on the outer peripheral side of the bent portion 32 and does not bulge toward the inner peripheral side of the bent portion 32 when the bent portion 32 is formed by folding the portion of the carpet 30.

As a result of forming the folded portions 34, the force for bending the carpet 30 in a reverse S-shape, which is generated between the portion 30A of the carpet 30 that extends toward the rear side from the backboard 11 and the portion 30B of the carpet 30 that extends toward the front side from the top of the deck panel DBp, is appropriately transmitted to the bent portion 32 due to the increased rigidity of these folded portions 34, and thus, stress appropriately concentrates at the bent portion 32, thereby promoting bending deformation such that the curve of the reverse S-shape is increased. Also, due to the folded portions 34, the edge portions of the curved portion 30C of the carpet 30 in the vehicle width direction can curve in a taut manner in which the edge portions do not easily droop down even if the edge portions receive force from the outside. In addition, this tension enables the center portion of the curved portion 30C in the vehicle width direction to also curve in a taut manner in which the center portion does not easily droop down even if the center portion receives force from the outside.

In summary, the rear seat 1 of the example embodiment has the structure described below. That is, the vehicle seat (the rear seat 1) includes a flexible covering (the carpet 30) configured to extend from the seatback 10 to the deck board DB that is positioned behind the seatback 10 (i.e., the deck panel DBp positioned so as to be concealed in a location underneath (below) the front end side of the deck board DB). The seatback 10 is configured to tiltable in the front-rear direction. The covering (the carpet 30) includes the shaped portion (the bent portion 32) that is provided in an intermediate location in the length direction of the extending covering (the carpet 30) and is shaped to facilitate bending of the covering (the carpet 30) toward a region below the deck board DB; and the reinforcing portion (the folded portion 34) that increases the rigidity of a region away from the shaped portion (the bent portion 32) so as to facilitate transmission of elastic force to the shaped portion (the bent portion 32), the elastic force being generated at a time when the covering (the carpet 30) bends due to a change in the separation distance between both end portions of the extending covering (the carpet 30) in the length direction in response to tilting of the seatback 10.

According to this structure, when the separation distance between both end portions of the extending covering (the carpet 30) in the length direction changes due to tilting of the seatback 10, the elastic force, which is generated at the time when the covering (the carpet 30) bends due to that change in the separation distance, is appropriately transmitted to the shaped portion (the bent portion 32) due to the rigidity of the reinforcing portion (the folded portion 34), and the shaped portion (the bent portion 32) promotes deformation of the covering (the carpet 30) toward the region below the deck board DB. Therefore, the covering (the carpet 30) can be configured to more easily deform toward the region below the deck board DB, without pulling the covering (the carpet 30) downward.

Also, the reinforcing portion is constituted by the folded portions 34 that are formed along the end portions of the covering (the carpet 30) in the width direction. This structure makes it possible to obtain the reinforcing portion (the folded portions 34) simply by folding the end portions of the covering (the carpet 30) in the width direction.

Also, the covering (the carpet 30) further includes the shape retaining portion (the sewn portion 33) that keeps the shaped portion (the bent portion 32) in a shape that facilitates bending of the covering (the carpet 30). This structure enables the shaped portion (the bent portion 32) to function more effectively and stably.

The shaped portion is constituted by the V-shaped bent portion 32 that is provided in the covering (the carpet 30). Also, the shape retaining portion is constituted by a joined portion (the sewn portion 33) in which intermediate portions of the V-shaped bent portion 32 are joined together. This structure enables the shaped portion (the bent portion 32) to function more effectively.

Moreover, the reinforcing portion (the folded portions 34) is provided to extend up to the region where the shape retaining portion (the sewn portion 33) of the shaped portion (the bent portion 32) is provided. This structure makes it possible to more appropriately transmit elastic force generated at the time when the covering (the carpet 30) bends due to the tilting of the seatback 10, to the shaped portion (the bent portion 32) via the reinforcing portion (the folded portions 34).

Also, the reinforcing portion (the folded portions 34) is provided in both the region that extends toward the seatback 10 from the shaped portion (the bent portion 32) and the region that extends toward the deck board DB from the shaped portion (the bent portion 32). With this structure, the elastic force, which is generated at the time when the covering (the carpet 30) bends due to the tilting of the seatback 10, is transmitted to the shaped portion (the bent portion 32) from both the seatback 10-side and the deck board DB-side, and thus, the shaped portion (the bent portion 32) can more effectively function to bend and deform the covering (the carpet 30).

Heretofore, one example embodiment of the invention has been described, but the invention may be implemented in a variety of other modes other than the example embodiment described above. For example, the vehicle seat of the invention may be broadly applied to a seat provided in a vehicle other than an automobile, such as a train, and other types of vehicles such as an aircraft and a vessel, in addition to a rear seat of an automobile.

Also, the covering is not limited to a carpet employed in the example embodiment above. Various types of flexible planar material such as cloth and leather may also be employed. Also, the covering does not necessarily need to be attached to the back surface of the seatback, and may be attached to a portion other than the back surface of the seatback, such as the lower surface of the seatback. Further, the covering does not necessarily need to be attached to the deck panel that is positioned in a location concealed under the front end side of the deck board as described in the example embodiment, and the covering may also be attached to a location other than the location under the deck board, such as a location on the top of the deck board.

Moreover, the seatback may be provided to be tiltable in the front-rear direction with respect to the seat cushion, and the seatback may be provided to be tiltable in the front-rear direction with respect to a vehicle main body such as a floor. Also, the seatback may be tilted forward by a so-called tilt-down movement in which the seatback is tilted forward on or above an upper surface portion of the seat cushion while the seat cushion moves downward and forward.

Also, the shaped portion does not necessarily need to extend along the entire region of the covering in the width direction, and may extend in only a portion of the covering in the width direction. Also, the shaped portion does not necessarily need to extend straight in the width direction with respect to the covering, and may be curved or extend obliquely with respect to the length direction. Further, a plurality of the shaped portions may be respectively provided at a plurality of locations in the width direction or the length direction of the covering extending from the seatback to the deck board.

Also, the shaped portion may be formed simply by folding a portion of the covering, without retaining the shape by sewing or the like. Also, the shaped portion may be formed by providing a seam on the covering, instead of folding a portion of the covering, such that the shaped portion has a shape that promotes bending of the covering along the seam. Further, the shaped portion may be formed by opening a hole or making an indentation in a portion of the covering, such that the shaped portion has a shape that promotes bending of the covering along the hole or the indentation.

Also, the reinforcing portion may be formed by joining another member such as a patch made of cloth or resin to the covering, instead of forming the reinforcing portion by folding a portion of the covering. Also, the reinforcing portion may be formed by sewing a portion of the covering in a bag-shape and inserting a core into this bag-shaped portion. The reinforcing portion needs to be provided in a position in which the reinforcing portion can increase the rigidity of a region away from the shaped portion of the covering, and thus the reinforcing portion may be formed in only a region on one of two sides of the shaped portion of the covering in the length direction, instead of forming the reinforcing portion in regions on both sides. Also, the reinforcing portion may be formed in an intermediate portion, in addition to, or instead of the edge portions of the covering in the width direction. The reinforcing portion may be formed in only an edge portion in one side of the covering in the width direction.

Also, the entire covering may have a layered structure including a plurality of layers and the reinforcing portion may be constituted by the entire covering. Moreover, instead of forming the reinforcing portion that extends to the region where the shaped portion or the shape retaining portion is provided, the reinforcing portion may be formed such that the reinforcing portion does not extend to that region.

Further, the shape retaining portion needs to have a structure that keeps the shaped portion in a shape that facilitates bending. Instead of attaching together the surfaces of the shaped portion (the bent portion) bent in a V-shape by sewing, various methods may be employed to keep the shaped portion in a shape that facilitates bending. For example, it is possible to employ a method of joining the surfaces of the shaped portion together by an adhesive or a gluing agent, a method of joining the surfaces of the shaped portion using a zipper or a hook-and-loop fastener, a method of joining the surfaces of the shaped portion together using a fastening member such as a clip, or a method of hardening by resin impregnation molding.

Also, the direction in which deformation of the covering is promoted by the shaped portion may be any direction in which deformation toward a region below the deck board is promoted. For example, the direction in which deformation of the covering is promoted by the shaped portion may be, for example, a direction in which deformation is promoted toward the inside of the space between the deck board and the deck panel described in the example embodiment, or a direction in which deformation is promoted directly downward.

What is claimed is:

1. A vehicle seat comprising:
    a seatback configured to be tiltable in a front-rear direction; and
    a flexible covering comprising a layer of carpet configured to extend from the seatback to a deck board positioned behind the seatback, the covering includes:
        a shaped portion that is provided in an intermediate location in a length direction of the covering, and is shaped so as to facilitate bending of the covering toward a region below the deck board, and
        a reinforcing portion that is positioned around an outer peripheral side of the shaped portion and that increases rigidity of a region away from the shaped portion so as to facilitate transmission of an elastic force to the shaped portion, the elastic force being generated at a time when the covering bends due to a change in a separation distance between both end portions of the covering in the length direction in response to tilting of the seatback,
        wherein the reinforcing portion comprises a folded portion that extends along an end portion of the covering in a vehicle width direction, and wherein the folded portion comprises an edge portion of the carpet in the vehicle width direction folded and overlapped with another portion of the carpet.

2. The vehicle seat according to claim 1, wherein the covering further includes a shape retaining portion that keeps the shaped portion in a shape that facilitates bending of the covering.

3. The vehicle seat according to claim 2, wherein the reinforcing portion is provided to extend up to a region where the shape retaining portion of the shaped portion is provided.

4. The vehicle seat according to claim 2, wherein the shaped portion comprises a V-shaped bent portion provided in the covering, and the shape retaining portion comprises by a joined portion in which intermediate portions of the V-shaped bent portion are joined together.

5. The vehicle seat according to claim 1, wherein the reinforcing portion continuously covers the outer peripheral side of the shaped portion.

6. The vehicle seat according to claim 1, wherein the reinforcing portion is provided in both a region that extends toward the seatback from the shaped portion and a region that extends toward the deck board from the shaped portion.

7. The vehicle seat according to claim 1, wherein the reinforcing portion is a portion of the covering that is folded back upon itself to define overlapping layers of the covering.

\* \* \* \* \*